United States Patent [19]

Rodriguez et al.

[11] Patent Number: 4,677,519

[45] Date of Patent: Jun. 30, 1987

[54] SHORT-CIRCUIT PROTECTED MAINS SUPPLY UNIT, ESPECIALLY FOR TELEVISION RECEIVERS

[75] Inventors: José-Ignacio Rodriguez; Erich Jung, both of Villingen-Schwenningen, Fed. Rep. of Germany

[73] Assignee: Deutsche Thomson-Brandt GmbH, Villingen-Schwenningen, Fed. Rep. of Germany

[21] Appl. No.: 831,355

[22] Filed: Feb. 20, 1986

[30] Foreign Application Priority Data

Feb. 21, 1985 [DE] Fed. Rep. of Germany ....... 3505986

[51] Int. Cl.[4] .............................................. H02H 3/20

[52] U.S. Cl. ...................................... 361/101; 361/59; 361/111; 455/217

[58] Field of Search ..................... 361/59, 88, 93, 100, 361/101, 111, 115; 358/190, 243; 455/117, 217

[56] References Cited

U.S. PATENT DOCUMENTS

| | | | |
|---|---|---|---|
| 3,109,980 | 11/1963 | Wiley | 361/101 X |
| 3,517,264 | 6/1970 | Anderson, Jr. | 361/59 |
| 4,148,088 | 4/1979 | Meroni | 361/101 X |
| 4,494,164 | 1/1985 | Noel | 361/101 |
| 4,530,023 | 7/1985 | Brown | 361/101 X |
| 4,603,367 | 7/1986 | Müller | 361/100 X |

*Primary Examiner*—Roy N. Envall, Jr.
*Assistant Examiner*—Jeffrey A. Gaffin
*Attorney, Agent, or Firm*—Max Fogiel

[57] ABSTRACT

A short-circuit protected mains supply unit, especially for the screen-text component of a television receiver. A conventionally controlled unit is expanded in accordance with the invention with only a few components (T1 and T2) in such a way that it can be turned on electronically and its output is protected against short circuits.

6 Claims, 1 Drawing Figure

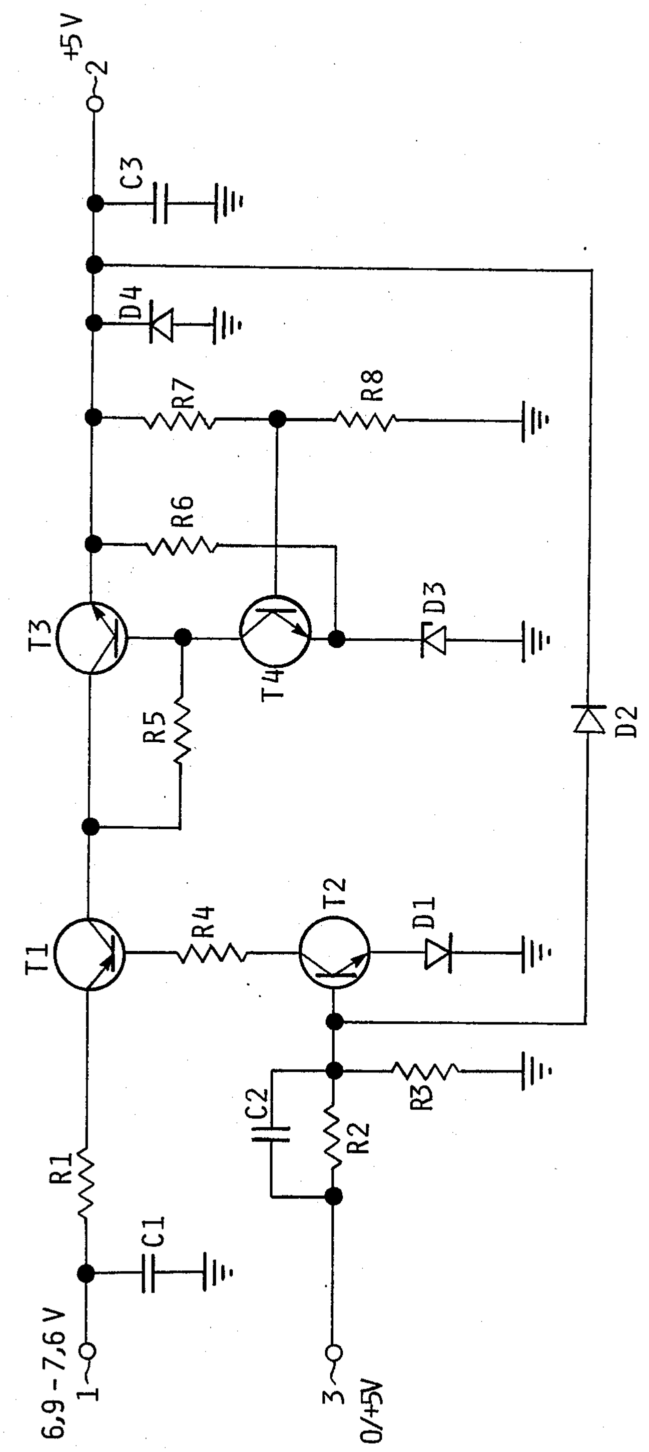
+5V
2
C3
D4
R7
R8
R6
T3
T4
D3
R5
D2
T1
R4
T2
D1
C2
R3
R2
R1
C1
6,9 - 7,6 V
1
3
0/+5V

SHORT-CIRCUIT PROTECTED MAINS SUPPLY UNIT, ESPECIALLY FOR TELEVISION RECEIVERS

BACKGROUND OF THE INVENTION

The invention concerns a short-circuit protected mains supply unit that can be electronically switched on at a control terminal. A mains supply unit of this type is needed in the television-screen text component of a television receiver for example. Electronic switching is necessary because the mains supply unit is intended to be switched on from the remote-control unit only during television-screen text operation.

The longitudinal path of known stabilized mains supply units generally contains a transistor, and the base of the transistor is controlled to stabilize the output voltage. The collector of another transistor is connected to the base. A reference voltage from a Zener diode is applied to the emitter of the second transistor and a controlled stabilization variable in the form of part of the output voltage is applied to its base.

SUMMARY OF THE INVENTION

The object of the invention is to design a mains supply unit of the aforesaid type that has simple means of switching and that be switched on electronically, with its output protected against short circuits. The circuitry in accordance wtih the invention requires only a few components, because they operate in conjunction to ensure not only electronic switching but also protection against short circuits at the output. The previously employed supplementary anti-short-circuit devices involving thyristors that are no longer necessary. The mains supply unit is is switched on slowly or "weakly" because the unit itself is in a practical way not switched on until the charging capacitor at the output has been charged.

BRIEF DESCRIPTION OF THE DRAWING

An electrical schematic diagram showing the essential circit components in accordance with the present invention.

DESCRIPTION OF THE PREFERRED EMBODIMENTS

One embodiment of the invention will now be described with reference to the drawing. The input terminal 1 of the mains supply unit illustrated in the figure receives a non-stabilized direct-current voltage of about 6.9–7.6 V. There is a stabilized direct-current voltage of +5 V at output terminal 2. The unit contains a known stabilization circuit that includes transistors T3 and T4, resistors R5, R6, R7, and R8, and Zener diodes D3 and D4. Zener diode D3 supplies a reference voltage to the emitter of transistor T4. A control voltage that is proportional to the output voltage is tapped from resistors R7 and R8 and controls the base of transistor T3 through transistor T4 for purposes of stabilization. A smoothing capacitor C1 and a protective resistor R1 are also connected to input terminal 1.

The aditional circuitry that turns the unit on and protects it against short circuits consists of transistors T1 and T2, resistors R2 and R3, capacitor C2, and diodes D1 and D2.

How this circuitry operates will now be described.

The voltage at control terminal 3 is zero when the mains supply unit is switched off. Transistor T2 is accordingly blocked and, since it can convey no collector current, transistor T1 receives no base current and is also blocked. This keeps input terminal 1 disconnected from transistor T3, and the overall unit is out of operation.

To switch the mains supply unit on, to initiate operation of a passage of television-screen text stored in the unit for instance, a voltage of +5V is applied to control terminal 3 witha remote-control unit. Capacitor C2 charges through diode D2 and through the previously uncharged capacitor C3. When capacitor C3 is charged to a fraction, approximately 0.6 V, of its final operating voltage of 5 V, diode D2 blocks, disconnecting the base of transistor T2 from charging capacitor C3. Charging capacitor will now already have a voltage of +0.6 V. The mains supply unit, however, will still be kept off by transistors T1 and T3. The current that charges capacitor C2 will now flow on through the base-emitter section of transistor T2 and through diode D1. This makes transistor T2 conductive and generates a base current at transistor T1. Transistor T1 also becomes conductive and switches completely through, so that all of the illustrated circuitry, including transistors T3 and T4 begins to operate. The stabilizing voltage at output terminal 2 is now +5 V.

When a short circuit occurs at terminal 2, the cathode of diode D2 will be grounded, so that diode D2 is conductive and a its current voltage of about 0.6 V will be at the base of transistor T2. For transistor T2 to be conductive, however, the base-emitter voltage needed for switchng through and the current voltage from diode D1 will have to be overcome. Since the sum of these two voltages, however, is higher than 0.6 V, transistor T2 will be blocked, and the base of transistor T1 will no longer be controlled, so that the transistor will block and the control circuit that involves transistors T3 and T4 will no longer obtain voltage. The voltage at output terminal 2 will collapse as desired, and the short circuit will not endanger any of the components.

Once the short circuit has been eliminated, the unit will turn on as previously described. One advantage of this circuitry is that, when transistor T1 switches through and the control circuit goes into operation, charging capacitor C3 will already be charged to +0.6 V. If the eapacitor were discharged at that instant, the circuitry would immediately register a short circuit at the output when turned on and would turn off again.

The aforesaid charging procedure results in a desirably weak voltage switch-in at terminal 2 subsequent to a certain delay.

The individual components in one practically proven embodiment of the type illustrated in the figure have the following values:

R1: 0.22 ohms
R2: 1 kohm
R3: 10 kohms
R4: 100 ohms
R5: 100 ohms
R6: 390 ohms
R7: 120 ohms
C1: 1000 μuF
C2: 47 μuF
C3: 100 μuF
D1: Type 1N4148
D2: Type 1N4001
D3: Type ZPD2.7
D4: Type ZPY5.6

T1: Type BD202
T2: Type BC548B
T3: Type BDX53
T4: Type BC548C.

Since the switchng off attained with transistor T1 can basically also be attained with transistor T3, the former can be eliminated.

We Claim:

1. A short-circuit protected mains supply unit, particularly for a television receiver, that can be switched on electronically at a control terminal, comprising: a first transistor with emitter-collector path connected between an input terminal and an output terminal; a charging capacitor connected to said output terminal and receiving a direct-current voltage for charging; a second transistor with collector-emitter path connected between the base of said first transistor and ground potential; said second transistor having a base connected to a control terminal, operating voltage supplied to said output terminal being electronically switchable on and off by voltage on said control terminal; a diode connected between the base of said second transistor and said charging capacitor for decoupling said output terminal from the base of said second transistor, so that when a short circuit appears at said output terminal said diode becomes conductive and said first and second transistors become cut off resulting in breakdown of voltage at said output terminal and protection thereby of circuit components from the short circuit.

2. A short-circuit protected mains supply unit as defined in claim 1, including a further diode connected between said second transistor and said ground potential.

3. A short-circuit protected mains supply unit as defined in claim 1, including an R-C stage connected between said control terminal and the base of said second transistor.

4. A short-circuit protected mains supply unit as defined in claim 1, wherein said emitter-collector path of said first transistor connected between said input terminal and said output terminal is controlled by output voltage at said output terminal said first transistor stabilizing said output voltage.

5. A short-circuit protected mains supply unit, particularly for a television receiver, that can be switched on electronically at a control terminal, comprising: a first transistor with emitter-collector path connected between an input terminal and an output terminal; a charging capacitor connected to said output terminal and receiving a direct-current voltage for charging; a second transistor with collector-emitter path connected between the base of said first transistor and ground potential; said second transistor having a base connected to a control terminal, operating voltage supplied to said output terminal being electronically switchable on and off by voltage on said control terminal; a diode connected between the base of said second transistor and said charging capacitor for decoupling said output terminal from the base of said second transistor, so that when a short circuit appears at said output terminal said diode becomes conductive and said first and second transistors become cut off resulting in breakdown of voltage at said output terminal and protection thereby of circuit components from the short circuit; a further diode connected between said second transistor and said ground potential; and an R-C stage between said control terminal and the base of said second transistor.

6. A short-circuit protected mains supply unit, particularly for a television receiver, that can be switched on electronically at a control terminal, comprising: a first transistor with emitter-collector path connected between an input terminal and an output terminal; a charging capacitor connected to said output terminal and receiving a direct-current voltage for charging; a second transistor with collector-emitter path connected between the base of said first transistor and ground potential; said second transistor having a base connected to a control terminal, operating voltage supplied to said output terminal being electronically switchable on and off by voltage on said control terminal; a diode connected between the base of said second transistor and said charging capacitor for decoupling said output terminal from the base of said second transistor, so that when a short circuit appears at said output terminal said diode becomes conductive and said first and second transistors become cut off resulting in breakdown of voltage at said output terminal and protection thereby of circuit components from the short circuit; a diode connected between emitter of said second transistor and said ground potential; an R-C stage connected between said control terminal and the base of said second transistor, said R-C stage comprising a resistor connected in parallel with a capacitor; said first transistor stabilizing output voltage appearing at said output terminal; said charging capacitor being already charged after a short-circuit has been eliminated and said unit has been switched on, discharge of said capacitor upon switching said unit on being sensed by said unit as a short-circuit at said output terminal so that said unit is switched off again for safety.

* * * * *